Patented Feb. 20, 1951

2,542,642

UNITED STATES PATENT OFFICE 2,542,642

ORGANIC HETEROCYCLIC QUATERNARY AMMONIUM COMPOUNDS

Adrien S. Du Bois, Jersey City, N. J., and Emery I. Valko, New York, N. Y., assignors to Onyx Oil & Chemical Company, Jersey City, N. J., a corporation of Delaware No Drawing. Application December 28, 1946, Serial No. 719,140

6 Claims. (Cl. 260—247.7)

Our invention relates to novel organic compounds useful as cationic surface active agents or germicides and as intermediates in the preparation of other compounds possessed of even greater surface active and germicidal properties.

This application is in part a continuation of our application, Serial No. 564,548, filed November 21, 1944, now abandoned.

Our compounds are characterized in that they contain a nitrogen atom linked to the terminal carbon atom in the $(CH_2)_n$ portion of the group

in which R is an alkyl group containing at least five carbon atoms and $n$ is an integer greater than 1.

The compounds of our invention conform to the formula

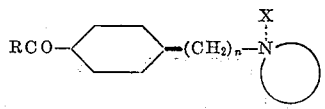

in which R and $n$ have the same significance as above, X represents a halogen atom, most suitably bromine or chlorine, and in which the circle indicates that the nitrogen atom is part of a heterocyclic ring system which may involve one or two rings.

As exemplary of such compounds may be mentioned: hexoyl phenethyl pyridinium bromide, lauroyl phenethyl pyridinium bromide, octanoyl phenethyl pyridinium bromide, lauroyl phenylpropyl quinolinium bromide, undecoyl phenylbutyl quinolinium chloride, hexadecoyl phenylpropyl picolinium bromide, octadecoyl phenethyl isoquinolinium bromide, the chlorides and bromides of N-hexoylphenethyl morpholine, heptoyl phenethyl pyridinium bromide, etc.

The compounds are best, but not necessarily, prepared by reacting the corresponding alkoyl-phenylalkyl halides

with heterocyclic amines. Amines which may be employed include those indicated by the above list of representative compounds, e. g. pyridine, quinoline, isoquinoline, morpholine, and picoline and other mono- or bi-cyclic heterocyclic amines containing only one nitrogen atom in the ring.

The alkoyl phenylalkyl halides with which we react the amines may be prepared by any suitable method, but we generally prepare them in accordance with the application of which the instant application is a continuation, by the acylation of the corresponding halogenated-alkyl phenyl compounds, i. e. halogenated-alkyl phenyl compounds in which the halo-alkyl radical contains at least two carbon atoms and in which the halogen atom is attached to the terminal carbon atom of the halo-alkyl group. Depending upon the product ultimately desired, the compound acylated may or may not contain one or more nuclear substituents in addition to the halogenated alkyl radical. The acylation reaction may be effected using a Friedel-Crafts type catalyst, e. g. aluminum chloride, boron fluoride, etc., and at a relatively low temperature. The precise temperature employed depends upon the particular reactants, but is usually within the range 10° C. to 60° C. Inert solvents conventionally used in conjunction with Friedel-Crafts type catalyst, carbon disulfide, for instance, may be utilized to maintain the reaction mixture at the desired temperature.

The reaction between the alkoyl phenylalkyl halide and the amine proceeds at a temperature determined chiefly by the reactivity of the nitrogen-containing reactant and the length of the reaction period is similarly determined. Usually a temperature within the range 80° C.–140° C. and a reaction period of from 30 minutes to several hours are required, but in some cases the reaction may go to completion within a short time even at room temperature. It is our practice to use either an equimolecular quantity or an excess of the nitrogen-containing reactant. Solvents such as mono and polyhydroxy alcohols may be employed where the use of a solvent is indicated or is felt to be desirable. As between the alkoyl phenylalkyl chlorides and the alkoyl phenylalkyl bromides, we prefer the latter as they seem to be somewhat more reactive.

Our invention is illustrated by the following specific examples which are not to be taken as in any way limitative of the scope thereof:

Example I 539 parts by weight of lauroylphenethyl bromide are heated with 120 parts by weight of pyridine at 120° C. for 2 hours. The resulting quaternary ammonium compound, lauroyl phenethyl pyridinium bromide, is soluble in water and its aqueous solution foams copiously. When tested for its antibacterial properties in accordance with the method described in Circular No. 198 of the United States Department of Agriculture, a dilution of 1:10,000 kills *Eberthella typhosa* and a dilution of 1:20,000 kills *Staphylococcus aureus* at 20° in 10 minutes.

*Example II*

162 parts by weight of caprylyl phenethyl bromide and 70 parts by weight of pyridine are reacted at 40° for 6 hours to obtain caprylyl phenethyl pyridinium bromide. This water soluble product shows a killing dilution of 1:1700 against *Eberthella typhosa*.

*Example III*

290 parts by weight of caproyl phenethyl bromide and 90 parts by weight of pyridine are reacted at 140° C. for 5 hours to obtain caproyl phenethyl pyridinium bromide. The product kills *Eberthella typhosa* in a dilution of 1:1,000.

*Example IV*

430 parts by weight of lauroyl phenethyl bromide are heated with 150 parts by weight of quinoline at 120° C. for 1½ hours. The product obtained, lauroyl phenethyl quinolinium bromide, is soluble in water. When tested according to the method described in Circular No. 198 of the United States Department of Agriculture it shows a killing dilution of 1:5,000 against *Eberthella typhosa* at 20° in a minute.

*Example V*

190 parts by weight of caproyl phenylethyl bromide and 79 parts by weight of pyridine are heated at 140° C. for 6 hours. The product is washed with ether in order to remove the impurities consisting mostly in unreacted reagents. The remaining material consisting predominately of caproyl phenethyl pyridinium bromide is soluble in water. When tested for its anti-bacterial property according to the method described in Circular No. 198 of the United States Department of Agriculture it kills *Eberthella typhosa* in 1:1,900 dilution at 20° C. in 10 minutes.

We claim:

1. Organic chemical compounds conforming to the formula

in which R represents an alkyl group containing at least 5 carbon atoms, $n$ is an integer greater than 1, and A is a quaternary ammonium radical of the group consisting of the pyridinium, quinolinium, isoquinolinium, morpholinium and picolinium radicals, the nitrogen atom of the quaternary ammonium radical being linked directly to the terminal carbon atom of the $(CH_2)_n$ group, and also to a halogen atom.

2. Method of preparing organic chemical compounds conforming to the formula

in which R represents an alkyl group containing at least 5 carbon atoms, $n$ is an integer greater than 1, and A is a quaternary ammonium radical of the group consisting of the pyridinium, quinolinium, isoquinolinium, morpholinium, and picolinium radicals, the nitrogen atom of the quaternary ammonium radical being linked directly to the terminal carbon atom of the $(CH_2)_n$ portion of the group and also to a halogen atom, the method comprising reacting a heterocyclic nitrogen compound of the class consisting of pyridine, quinoline, isoquinoline, morpholine and picoline with a compound conforming to the formula

in which R and $n$ have the same significance as in the preceding formula and X represents a halogen atom.

3. Lauroyl phenethyl pyridinium bromide—

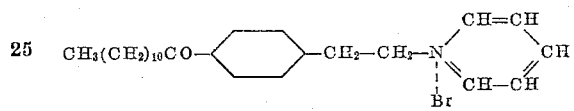

4. Lauroyl phenethyl quinolinium bromide—

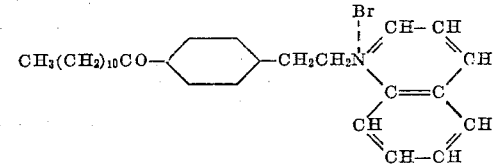

5. Caprylyl phenethyl pyridinium bromide.
6. Caproyl phenethyl pyridinium bromide.

ADRIEN S. DU BOIS.
EMERY I. VALKO.

REFERENCES CITED

The following references are of record in the file of this patent:

UNITED STATES PATENTS

| Number | Name | Date |
| --- | --- | --- |
| 2,097,640 | Piggot | Nov. 2, 1937 |
| 2,271,707 | Munz | Feb. 3, 1942 |
| 2,276,787 | Metler | Mar. 17, 1942 |

FOREIGN PATENTS

| Number | Country | Date |
| --- | --- | --- |
| 499,203 | Great Britain | 1939 |

OTHER REFERENCES

Foreman: J. American Chem. Soc., June 1940, pp. 1435–1438.